Patented Nov. 16, 1948

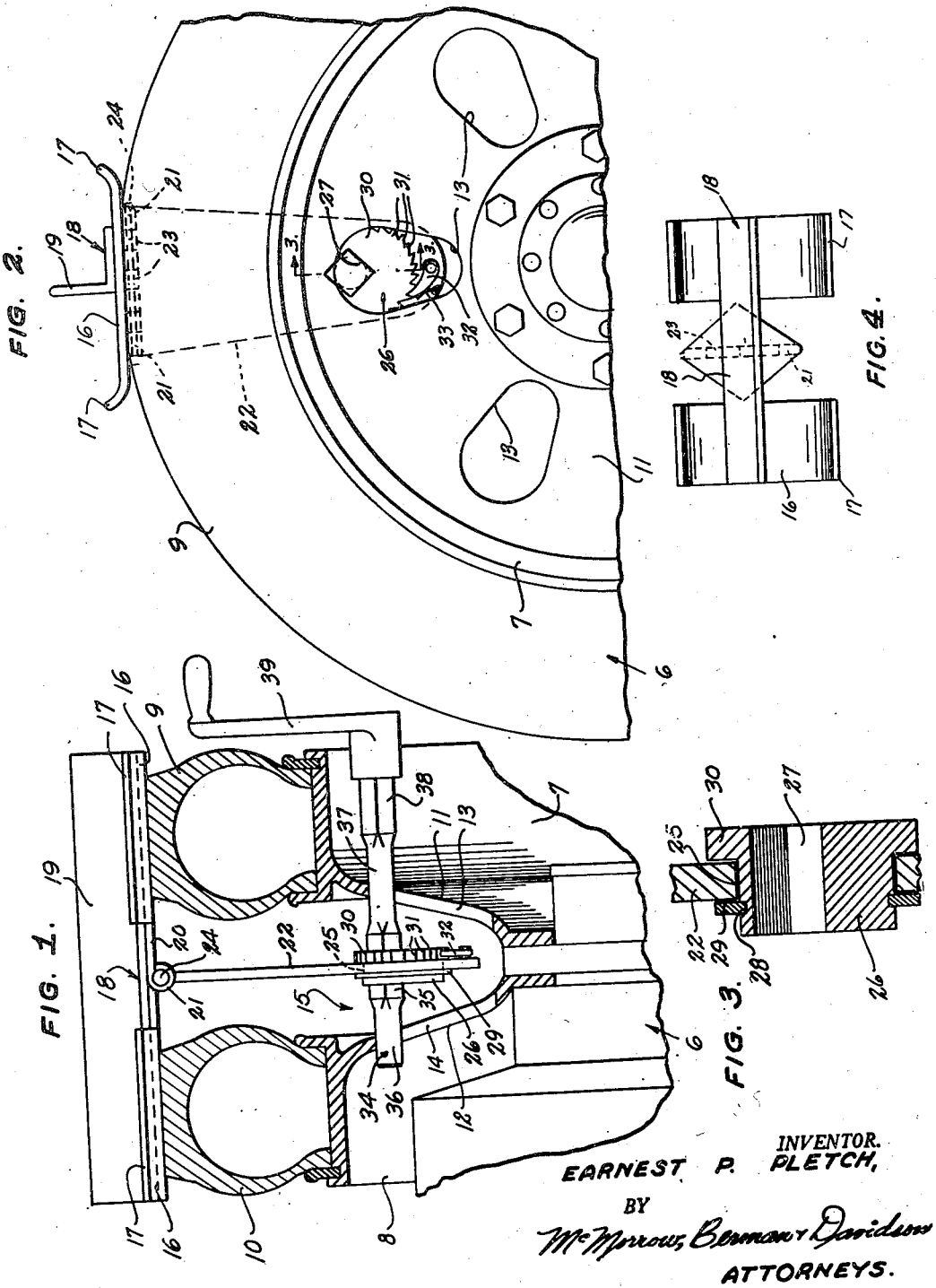

2,454,005

UNITED STATES PATENT OFFICE 2,454,005

TRACTION INCREASING DEVICE FOR DUAL WHEEL VEHICLES

Earnest P. Pletch, Frankfort, Ind.

Application December 9, 1947, Serial No. 790,639

4 Claims. (Cl. 152—220)

My invention relates to a traction increasing device for dual wheel vehicles.

A primary object of the invention is to provide a traction increasing device which is easy to apply to the dual driving wheels of heavy vehicles, under conditions where it would be difficult or impossible to apply skid chains, or the like.

A further object is to provide a traction increasing device which may be applied to the dual driving wheels, even when the same are sunk deeply in mud or similar soft matter.

A further object is to provide a traction increasing device which is designed so as not to injure the tires of the wheel to which it is applied.

A still further object is to provide a device of the above mentioned class, which is simple and strong, comprising few parts and which is very efficient in the use for which it was intended.

Other objects and advantages of the invention will be apparent during the course of the following description.

In the accompanying drawings,

Figure 1 is a fragmentary vertical section through a dual wheel upon which one of the traction increasing devices is being applied, Figure 2 is a side elevation of a wheel and traction increasing device, Figure 3 is an enlarged fragmentary vertical section taken on line 3—3 of Figure 2, and, Figure 4 is a plan view of the traction increasing device removed.

In the drawings, where for the purpose of illustration is shown a preferred embodiment of the invention, the numeral 6 designates a dual wheel, such as a driving wheel of a truck, and including companion wheel sections 7 and 8, upon which are mounted tires 9 and 10, as shown. The wheel sections 7 and 8 have inner opposed discs 11 and 12, provided with a plurality of circumferentially equidistantly spaced aligned openings 13 and 14. A relatively narrow annual space 15 is formed between tires 9 and 10 and discs 11 and 12, as shown.

The traction increasing device comprises a pair of rectangular generally flat plates or shoes 16, which are identical, and adapted to engage upon the treads of the tires 9 and 10, when the device is in use. The opposite lateral edges of both shoes 16 are upturned, as shown at 17 so that such edges cannot cut the tire treads. Rigidly secured to the outer surfaces of shoes 16, by means of welding, or the like, and extending laterally across both shoes is a transverse angle member or traction bar 18, having a longitudinal upstanding web 19 which projects radially, with respect to wheel 6. The outer ends of traction bar 18 are flush with the outer side edges of shoes 16, and the bar 18 bridges the annular space 15, as shown. The web 19 is arranged at the longitudinal centers of shoes 16, as shown, and forms with the same a rigid structure.

Rigidly secured to the bottom side of bar 18, by means of welding or the like, is a diamond shaped flat plate 20, having one pair of corners disposed at the transverse center of bar 18, and the other pair of corners on a line through the center opening 15, and at right angles to bar 18. The plate 20 has a plurality of depending hinge knuckles 21 formed upon it, and in axial alignment, and extending between the two corners of plate 20 on the line perpendicular to bar 18. Disposed at the center of opening 15, and extending radially into the same when the traction increasing device is in use, and hingedly connected to the plate 20 is a flat tension plate or strap 22, including hinge knuckles 23 formed at its outer edge to interfit with the knuckles 21. A hinge pin 24 is passed through the interfitting knuckles 21 and 23, and serves to hingedly connect tension strap 22 with plate 20, as shown. Tension strap 22 may taper slightly toward its inner free end, and such free end extends near the inner sides of openings 13. Tension strap 22 is provided with a circular opening 25, near its inner free end in axial alignment with an adjacent pair of the openings 13.

Rotatably mounted within the opening 25 is a rotatable bushing or cam 26, having a square opening 27 extending axially through the same. The bushing 26 has an annular groove 28 formed in its outer periphery, adjacent to the inner side of tension strap 22. A snap ring 29 engages in the groove 28 to secure the bushing in place in the assembly. Adjacent to the outer side of tension strap 22, and coacting with snap ring 29 to prevent axial movement of bushing 26 is an annular shoulder 30, upon the outer periphery of which are formed rachet teeth 31. A pawl 32 is pivotally mounted upon the outer side of tension strap 22, directly beneath shoulder 30, and the pawl is urged into engagement with the teeth 31 by a spring 33, also mounted upon tension strap 22.

A detachable wrench bar 34 is provided, and this bar includes an intermediate square portion 35 for insertion within the square opening 27. Bar 34 further includes a cylindrical end portion 36 to engage the outer edge of one opening 13, and an intermediate cylindrical portion 37 to engage the outer edge of the opposite opening 13, in a pair of such openings. Bar 34 is of sufficient length to extend through a pair of openings 13, and to extend outwardly laterally with respect to wheel section 7, as shown. At its outer end, bar 34 has a square portion 38, to be detachably engaged by a suitable wrench handle or crank 39, Figure 1.

In use, one or more, and preferably three of the traction increasing devices are applied to a dual wheel, as shown in Figure 1. After the device is opened up, and tension strap 22 is inserted between wheel sections 7 and 8, the device is adjusted until the square opening 27 is aligned with a pair of openings 13. The bar 34 is then inserted through opening 27, as shown clearly in Figure 1. The detachable handle 39 is applied and turned, to turn bar 34 and bushing 26. Since the opening 27 is eccentric, when the bushing 26 is turned, the portions 36 and 37 of bar 34 are forced outwardly against the edges of openings 13. This action causes the shoes 16 to be clamped tightly against the treads of tires 9 and 10. The pawl 32 prevents turning of bushing 26 in the direction opposite to that in which it is turned to clamp shoes 16 against tires 9 and 10. With the device thus applied to the dual wheel, handle 39 is removed, and the vehicle may be driven from the mud or like substance in which it is stuck. The traction increasing devices are easy to apply, and very effective.

It is to be understood that the form of the invention herewith shown and described, is to be taken as a preferred example of the same, and that various changes in the shape, size and arrangement of parts may be resorted to, without departing from the spirit of the invention, or the scope of the subjoined claims.

Having thus described the invention, I claim:

1. A traction increasing device for dual wheels including opposed wheel sections having tires mounted thereon, the device comprising spaced shoes to engage upon the tire treads, a traction bar secured to the shoes and projecting generally radially from the tires, a tension member connected to the traction bar and projecting between the wheel sections, a rotatable element carried by the tension member and having an eccentric opening, a detachable member adapted to be inserted in the eccentric opening and to engage the wheel sections, and means to turn the detachable member.

2. A traction increasing device for dual wheels including opposed wheel sections having openings and tires mounted thereon, said device comprising spaced shoes to engage upon the tire treads, a traction bar secured to the shoes and extending across the same, a tension strap hingedly connected to the traction bar near the longitudinal center of the same and extending between said wheel sections, the tension strap having an opening adjacent to the openings in the wheel sections, a rotatable bushing mounted within the opening in the tension strap and having an eccentric opening, a bar for insertion within the eccentric opening and the openings in the wheel sections and adapted to be turned for turning the bushing, and means to prevent the turning of the bushing in one direction.

3. A traction increasing device for dual wheels including wheel sections having openings and tires mounted thereon, said device comprising spaced shoes to engage upon the tire treads, a traction bar secured to the shoes and extending across the same, a tension member connected to the traction bar near its longitudinal center and disposed between the wheel sections, a rotatable element carried by the tension member and having an eccentric opening near the openings of the wheel sections, and a member for insertion in the eccentric opening and openings of the wheel sections and adapted to be turned by a wrench or the like for turning the rotatable element.

4. A traction increasing device for dual wheels including wheel sections having openings and tires mounted upon the sections, the device comprising spaced substantially flat shoes to engage upon the tire treads, a traction bar secured to the shoes and extending laterally across the same, a tension member attached to the traction bar near its longitudinal center and extending between said wheel sections, the tension member having an opening adjacent to the openings in the wheel sections, and a rotatable bushing mounted within the opening of the tension member and having an eccentric opening adapted to receive a bar or the like therein, and means to prevent rotation of the bushing in one direction.

EARNEST P. PLETCH.

No references cited.